Nov. 26, 1935.   H. E. VAN VOORHEES ET AL   2,022,015
WINDOW ASSEMBLY FOR AN AUTOMOTIVE VEHICLE
Filed May 28, 1934   3 Sheets-Sheet 2
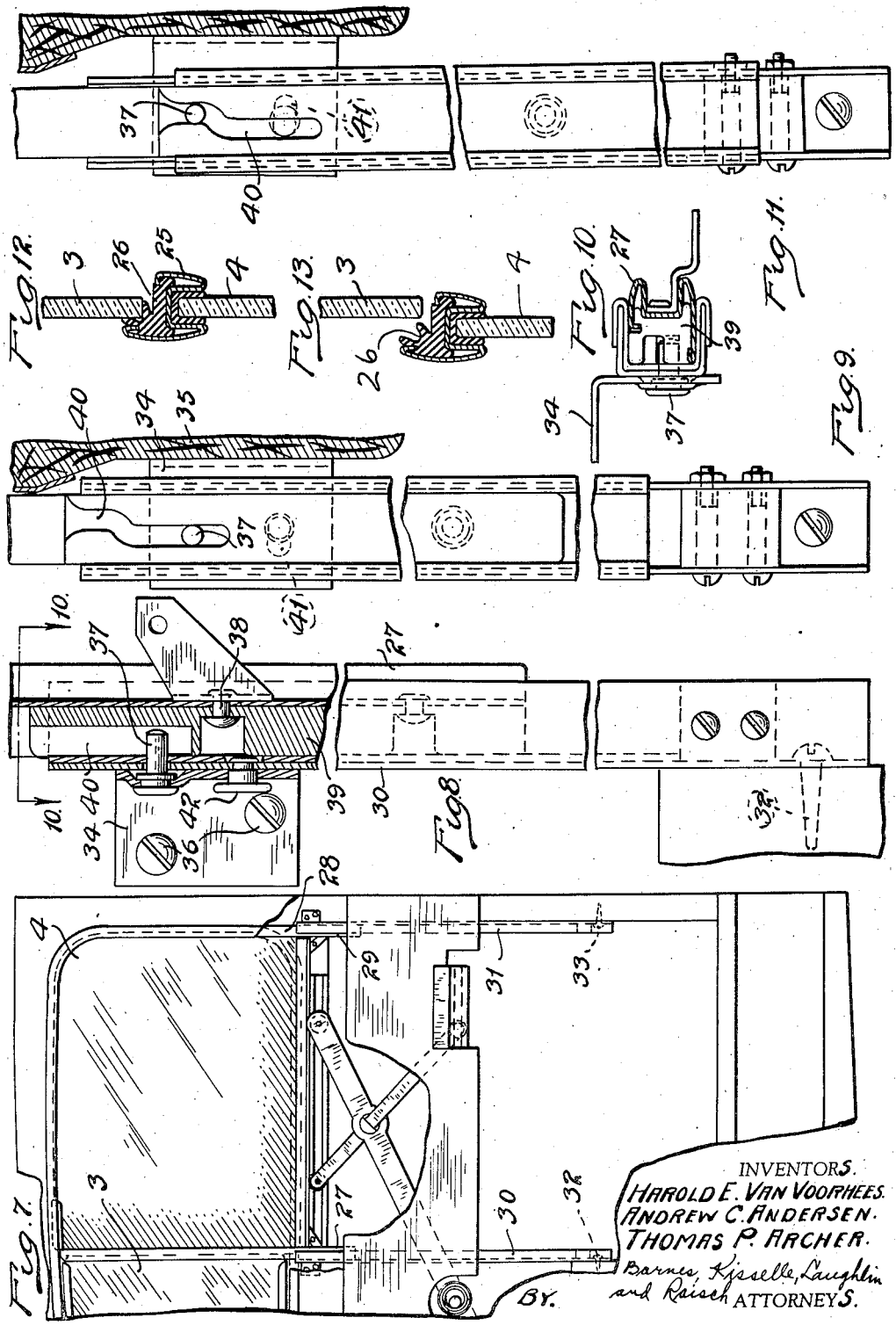
INVENTORS.
HAROLD E. VAN VOORHEES.
ANDREW C. ANDERSEN.
THOMAS P. ARCHER.
Barnes, Kisselle, Laughlin
and Raisch ATTORNEYS.

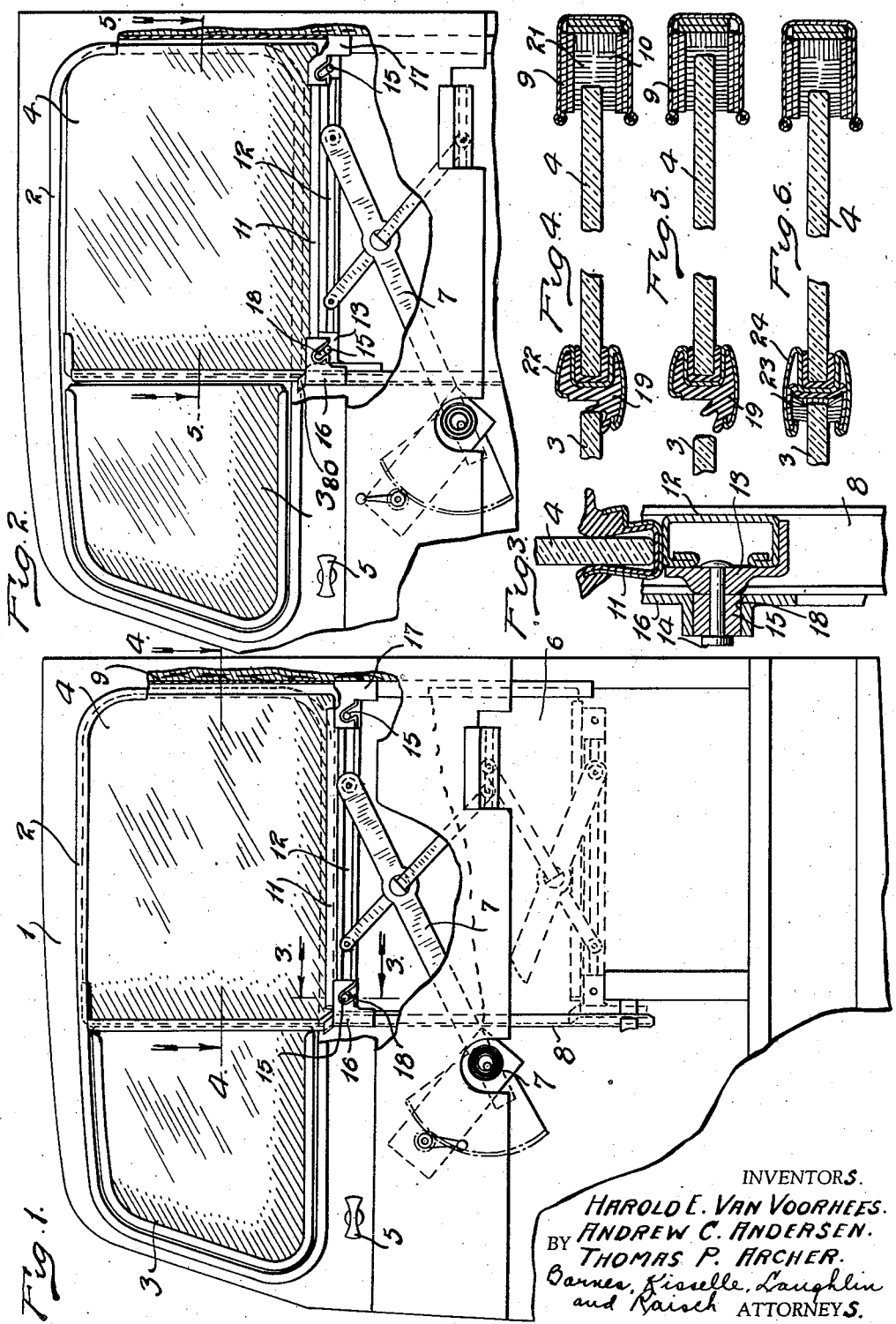

Nov. 26, 1935.  H. E. VAN VOORHEES ET AL  2,022,015
WINDOW ASSEMBLY FOR AN AUTOMOTIVE VEHICLE
Filed May 28, 1934   3 Sheets-Sheet 3
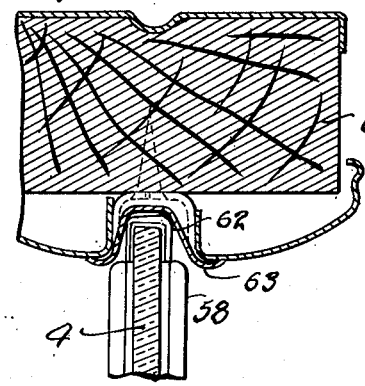
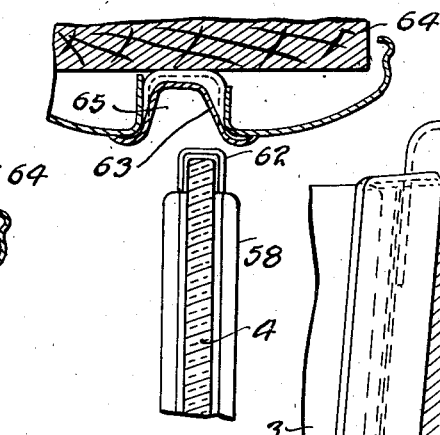
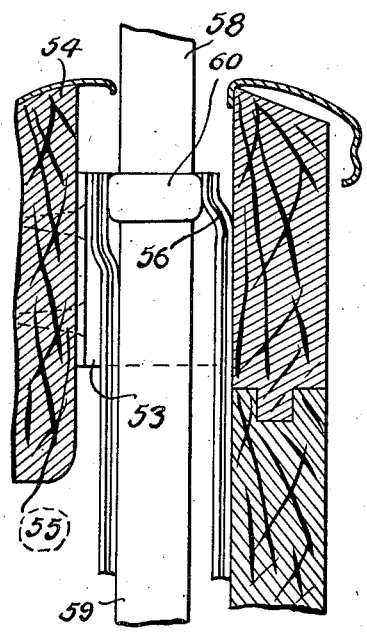
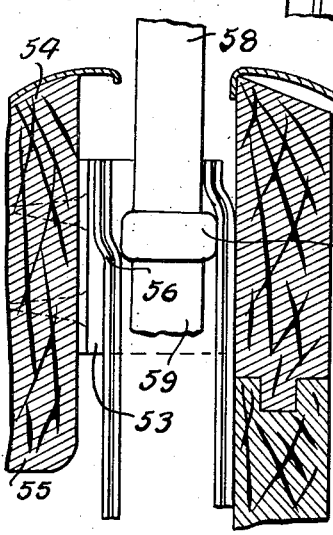
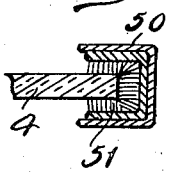
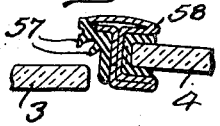
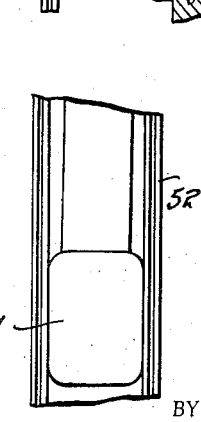
INVENTORS.
HAROLD E. VAN VOORHEES.
ANDREW C. ANDERSEN.
BY THOMAS P. ARCHER.
Barnes, Kisselle, Laughlin & Raisch
ATTORNEYS.

Patented Nov. 26, 1935

2,022,015

UNITED STATES PATENT OFFICE 2,022,015

WINDOW ASSEMBLY FOR AN AUTOMOTIVE VEHICLE

Harold E. Van Voorhees, Windsor, Ontario, Canada, and Andrew C. Andersen and Thomas P. Archer, Detroit, Mich., assignors to Ternstedt Manufacturing Company, Detroit, Mich., a corporation of Michigan Application May 28, 1934, Serial No. 727,852

5 Claims. (Cl. 296—44)

This invention relates to a window assembly for an automotive vehicle. This invention relates more particularly to a window assembly for an automobile of the type shown in copending application 644,622, popularly known as the Fisher No Draft ventilation system. However, it is understood that the invention is applicable to other window assemblies having window panels which are slidable into and out of the window opening and arranged to be sealed against the weather along one of the sliding edges when in raised position.

In the Fisher No Draft window assembly the front portion of the window opening is closed by a panel which is swingable about an upright axis and the rear portion of the window opening is closed by a panel which is slidable in and out of the window well. In this type of window assembly the adjoining edges of the swinging and sliding panel, when in closed position, are provided with a suitable weather seal such as a rubber weatherstrip which may be carried by one or the other of the panels. In such case in the raising and lowering of the sliding panel relative movement occurs between the weatherstrip and one or the other of the panels and the weatherstrip soon mevomes worn. This is particularly true where the weatherstrip is made from or contains rubber or other material having a high coefficient of friction. This frictional drag between one or the other of the panels and the weatherstrip also makes the sliding panel work hard.

It is an object of this invention to eliminate the wear on the weatherstrip in this type of window assembly and also facilitate the ease of operation of the slidable panel. This object has been achieved by disengaging the weatherstrip and the relatively movable panel which it seals before permitting any material relative movement between the weatherstrip and the said panel.

In the drawings:

Figure 1 is a side elevation showing the window assembly with the panels in closed position.

Figure 2 is a view similar to Figure 1 showing the position of the weatherstrip just after it has been disengaged from the swinging panel and before any material lowering movement on the part of the sliding panel has taken place.

Figure 3 is a section along the line 3—3 of Figure 1.

Figure 4 is a section along the line 4—4 of Figure 1.

Figure 5 is a section along the line 5—5 of Figure 2.

Figure 6 is a section similar to Figure 4 but showing a modified form of weatherstrip.

Figure 7 is a fragmentary view similar to Figure 1 of the modified form of the window assembly.

Figures 8 and 9 are detail views of the window assembly shown in Figure 7.

Figure 10 is a section along the line 10—10 of Figure 8.

Figure 11 is a detail similar to Figure 9 showing the position of the window guide channel after the window has been just slightly lowered.

Figure 12 is a detail section through the weatherstrip and the adjoining edges of the panels when in closed position.

Figure 13 is a view similar to Figure 12 just after the weatherstrip has been disengaged from the swinging panel.

Figure 14 is a vertical section showing a modified form of window assembly with the sliding window in raised position.

Figure 15 is a section similar to Figure 14 showing the window slightly lowered and the weatherstrip disengaged from the swinging panel.

Figure 16 is a detail showing the connection between the weatherstrip and the sliding panel.

Figures 17 and 18 are detailed sections through the adjoining panels and weatherstrip, respectively before and after the weatherstrip has been disengaged from the swinging panel.

Figure 19 is a detail section through the rear edge of the panel and the channel guide for this edge.

Referring more particularly to the drawings there is shown, for the purposes of description, a door 1 having a window opening 2. The window opening is arranged to be closed by a pair of glass panels 3 and 4. The panel 3 is arranged to be swung about an upright axis by any suitable regulator (not shown) operated by the crank handle 5. The panel 4 is arranged to be raised from and lowered into the window well 6 by any suitable window regulator such as the regulator generally designated 7. In the form shown the regulator 7 has two arms, each of which are provided at their outer ends with a stud having a slidable engagement in the attachment 12.

The panel 4, as it is raised and lowered in the window well 6, is guided along its front vertical edge below the belt by the channel guide 8 which is suitably mounted in the window well. The guide 8 has the inclined offset 80 at its upper end. The sliding panel 4 is guided along its rear vertical edge both above and below the belt in the channel guideway 9. Both the channel guideways 8 and 9 are provided with any suitable lining such as the pile lining 10. The lower edge of the sliding panel 4 is provided with a sash channel 11 to which is affixed the attachment 12 which connects the window regulator 7 to the window panel 4. The sash channel 11 also has mounted at each end a plate 13 which supports a pin 14 upon which is mounted a roller 15 (Fig. 3).

The window guide channels 8 and 9 have affixed thereto at the belt, plates 16 and 17. Plates 16 and 17 each have the cam slots 18 which are inclined upwardly and forwardly and parallel to each other.

Figures 4 and 6 show different types of seals between the adjoining vertical edges of the sliding and swinging panels. In Figure 4 the seal comprises a rubber weatherstrip 19 mounted in a metal channel 22 of H section which is secured to the front vertical edge of the sliding panel 4. With this form the swinging panel 3 can be swung to open position when the panel 4 is raised. In the form shown in Figure 6 the weatherseal is effected by a weatherstrip 23 of felt or pile carried in an H channel 24 which is secured to the front vertical edge of the sliding panel 4. In this form the window 4 has to be lowered before the swinging panel can be swung to open position.

The operation of this form of window is as follows: As shown in Figure 1, the window panel 4 is in fully raised position with the rollers 15 at the top of the inclined parallel cam slots 18 and with the rubber weatherstrip 19 in sealing engagement with the rear vertical edge of the swinging panel 3. In fully raised position the rear vertical edge of the panel 4 is positioned outwardly or to the left of the bottom 21 of the window runway 9. When the window regulator 7 is actuated to lower the panel 4 the rollers 15 move downwardly and rearwardly in the cam slots 18 thus causing the window panel 4 to shift rearwardly in the window opening from the position shown in Figure 1 to that shown in Figure 2, immediately during the initial downward movement of the panel 4 and before any material lowering of the window has taken place thereby disengaging the weatherstrip 19 from the rear vertical edge of the swinging panel 3 as shown in Figure 5. By referring to Figures 2 and 5 it will be noted that the rear vertical edge of the sliding panel has now moved rearwardly or to the right to a position adjacent the bottom of the window channel guideway 9. In other words, the channel 9 is made sufficiently deep to accommodate the forward and rearward movement of the sliding panel 4 as it approaches or leaves fully raised position. After the rollers 15 leave the inclined cam slots 18 the rearward shifting movement of the window panel 4 ceases and the panel travels vertically downward in the guideways 8 and 9.

Upon raising the window the travel of the panel is vertically upward in the guideways 8 and 9 until the rollers 15 engage the cam slots 18 whereupon the window panel during the latter part of its upward travel is shifted forwardly so that the weatherstrip 19 engages the rear vertical edge of the panel 3. It will be noted that with this form of window assembly that there is practically no relative sliding movement between the weatherstrip 19 and the rear edge of the swinging panel 3. The vertical depth of each cam slot 18 need be only about one-half inch. The cam slots 18 and the rollers 15 are so positioned that a complete sealing engagement between the rear edge of the swinging panel and the weatherstrip 19 is not effected until the rollers engage the top of the cam slots 18, that is, until the window panel 4 is in fully raised position.

In the form shown in Figures 7 through 13 the window assembly is the same as that shown in the principal form except that the specific mechanism for shifting the window laterally during the initial lowering of the sliding panel to disengage the weatherstrip from the rear vertical edge of the swinging panel is different. Instead of shifting the sliding panel rearwardly to disengage the weatherstrip from the edge of the swinging panel it is proposed to tilt the sliding panel inwardly of the window opening during the initial stage of lowering the swinging panel. To this end the H channel 25 carrying the weatherstrip 26 along the front vertical edge of the sliding panel 4 is provided with an extension 27 below the lower edge of the panel 4. The panel 4 is provided along its rear vertical edge with a sash channel 28 having an extension 29. The panel 4 is guided below the belt by the window guide channels 30 and 31, pivotally mounted at their lower end on the screws 32, 33. An angle bracket 34 is secured to the belt rail 35 by the screws 36 at the top of the channel guideways 30 and 31. Each of the brackets 34 has fixed thereto a pin 37. Each sash channel extension 27 and 29 has secured therein by the rivets 38 the cam member 39 which thus moves up and down with the window. The cam member 39 is provided with a cam groove 40 which slidably engages the fixed pin 37. The upper end of each of the channel guideways 30 and 31 has riveted thereto a pin 42 which has a sliding engagement in a slot 41 in the bracket 34. The operation of this form of window is as follows: As shown in Figure 7 the window is in raised position. At this time the pin 37 is positioned adjacent the bottom of the cam groove 40. When the window starts to move downwardly the cam member 39 travels with the window. Hence, as the cam portion of the groove 40 travels by the pin 37, the channel guides 30 and 31 and the window are pivoted inwardly of the window opening from the position shown in Figure 9 to that shown in Figure 11, thus causing the weatherstrip 26 to disengage from the rear vertical edge of the swinging panel 3, as brought out in Figures 12 and 13, thus upon further downward movement there is no friction sliding engagement between the weatherstrip and the swinging panel. When the panel 4 is raised with the weatherstrip 26 out of contact with the swinging panel 3, as the sliding panel reaches almost fully closed position, the pin 37 enters the cam groove 40 and the relative sliding movement between the pin 37 and the groove 40 tilts the window and its guide channels outwardly of the window opening to substantially vertical position thus engaging the weatherstrip and the rear vertical edge of the swinging panel 3.

In the form shown in Figures 14 through 19 the rear vertical edge of the sliding panel 4 is guided both above and below the belt in the usual metal channel guideway 50 provided with a suitable lining such as the pile lining 51. However, the front vertical edge of the sliding panel 4 is guided below the belt only in the channel runway 52. The channel runway 52 is fixed at its upper end to the bracket 53 which in turn is secured to the belt rail 54 by the screws 55. The channel runway 52 has its extreme upper end offset as at 56. The weatherstrip 57 is secured to an H channel 58 which in turn is clamped or otherwise secured along the front edge of the panel 4. The H channel 58 has an extension 59 below the bottom edge of the panel. The extension 59 has fixed thereto, adjacent its top and bottom, the slides 60 and 61 which slidably engage in the runway 52. The attaching clip 62 at the upper end of the H channel 59 engages with a cam plate 63 secured to the header 64 in the groove 65 which receives the top edge of the window panel 4 when in closed position.

The operation of this form of window assembly is as follows: In Figure 14 the panel 4 is shown in raised position. As soon as the panel 4 starts its downward travel, the slide 60 engages the cam offset 56 in the channel 52 thus causing the forward vertical edge of the panel 4 to swing inwardly of the window opening or to the right as viewed in Figures 14 and 15. This disengages the weatherstrip 57 from the rear vertical edge of the panel 3 as shown in Figure 18. This inward movement of the forward vertical edge of the panel 4 causes the entire panel 4 to hinge about its rear vertical edge which is slidably mounted in the runway 50, as shown in Figure 19. Thus during the remaining downward travel of the window the weatherstrip 57 is disengaged from the rear vertical edge of the panel 3 preventing frictional wear of the weatherstrip.

When the window is raised the reverse of this operation takes place. When the slide 60 reaches the cam offset 56 the forward edge of the window of the panel 4 is cammed outwardly from the position shown in Figure 15 to that shown in Figure 14 so that the weatherstrip 57 is moved from the position shown in Figure 18 to that shown in Figure 17, that is, into sealing engagement with the rear vertical edge of the sliding panel 3. As the slide 60 engages the cam offset 56 the clip 62 also engages the scuff plate 63, the cam face of which cooperates with the cam offset 56 to move the forward edge of the panel inwardly. As the panel is swung inwardly by the engagement of the slide 60 with the cam offset 56 the channel extension 59 pivots about the lower slide 56 and the window panel 4 also swings about its rear vertical edge which is slidably mounted in the window guide channel 50. Inasmuch as the lining 51 in the channel runway is yieldable, the hinging and displacement of the panel 4 about its rear vertical edge is readily permitted and accommodated.

In all forms of the invention the sliding window panel is at all times guided in the cushion lined window channel guides and thus prevented from rattling.

As used herein the "edge of the panel" may include the face portion of the glass panel adjacent the edge and also a frame in case the panel is provided with a frame.

We claim:

1. In a window assembly comprising a window opening having a window well therebelow, a pair of panels, one of which closes the front portion of the window opening and the other of which closes the rear portion of the window opening, one of said panels being movably arranged for lowering into the window well to open its portion of the window opening and for raising from the window well to close its portion of the window opening, sealing means for sealing the joint between the adjacent vertical edges of the panels mounted on one of said panels and having a sealing engagement with the adjacent vertical edge of the other panel, and means comprising a cam surface and a member arranged to engage the same during the initial lowering, and final raising, movement of the movable panel, one of which is mounted adjacent the mouth of the window well and the other of which is mounted on the lower edge of the movable panel whereby the movable panel during the initial lowering movement is shifted away from the other panel to disengage the sealing means from sealing engagement with the vertical edge of one of said panels to permit lowering of the movable panel without frictional engagement between the sealing means and one of said panels and during the final raising movement is shifted toward the other panel to engage the sealing means and the vertical edge of one of the panels.

2. In a window assembly comprising a window opening having a window well therebelow, a pair of panels, one of which closes the front portion of the window opening and the other of which closes the rear portion of the window opening, one of said panels being movably arranged for lowering into the window well to open its portion of the window opening and for raising from the window well to close its portion of the window opening, sealing means for sealing the joint between the adjacent vertical edges of the panels mounted on one of said panels and having a sealing engagement with the adjacent vertical edge of the other panel, and cooperating cam means mounted on the lower edge of the movable panel and in the upper part of the window well for shifting the rear panel rearwardly in its own plane to disengage the sealing means from sealing engagement with the vertical edge of the forward panel whereby the movable panel may be raised and lowered without frictional engagement between the sealing means and the vertical edge of the one panel.

3. In a window assembly comprising a window opening having a window well therebelow, a pair of panels one of which closes the front portion of the window opening and the other of which closes the rear portion of the window opening, a pair of channel guides for guiding the rear panel as it is raised and lowered into the window well, the front channel guide being positioned in the window well offset from the rear vertical edge of the front panel, sealing means mounted along the vertical edge of one of said panels having a sealing engagement with the adjacent vertical edge of the other panel when the panels are in closed position, and cam means comprising a cam slot and pin, one of which is mounted in the window well adjacent the mouth of the well and the other of which is carried by the lower edge of the rear panel for shifting the rear panel rearwardly in its own plane to disengage the sealing means from sealing engagement with the vertical edge of the one of said panels to permit the rear panel to be lowered with the sealing means thus disengaged.

4. In a window assembly comprising a window opening having a window well therebelow, a pair of panels, one of which closes the front portion of the window opening and the other of which closes the rear portion of the window opening, the rear vertical edge of the front panel being positioned adjacent the front vertical edge of the rear panel when in raised position, sealing means mounted on the vertical edge of one of the said panels and engaging the adjacent vertical edge of the other panel for sealing the joint between the panels, channel guideways slidably engaging the front and rear vertical edges of one of the said panels for guiding the same as it is raised from and lowered into the window well, the said guide channels being pivotally supported in the window well about an axis falling in the plane of the window panel, cam means mounted in the window well and on the lower edge of the slidable panel for pivoting the slidable panel, and channel guideways to disengage the sealing means from sealing engagement with the vertical edge of one of said panels to permit raising and lowering of the slidable panel while the sealing means is thus disengaged.

5. In a window assembly comprising a window opening having a window well therebelow, a pair of panels, one of which closes the front portion of the window opening and the other of which closes the rear portion of the window opening, the rear panel being slidable into and out of the window well, guideways slidably engaging the front and rear edges of the slidable panel for guiding the slidable panel as it is raised from and lowered into the window well, the said sliding panel being swingable about its rear vertical edge in the said window guide, sealing means mounted on the vertical edge of one of the said panels and having a sealing engagement with the adjacent vertical edge of the other panel for sealing the joint between the said panels, and means for swinging the said slidable panel about its rear vertical edge for disengaging the sealing means from sealing engagement with the vertical edge of one of said panels whereby the slidable panel may be raised and lowered with the sealing means thus disengaged.

HAROLD E. VAN VOORHEES.
ANDREW C. ANDERSON.
THOMAS P. ARCHER.